(No Model.)
A. HOEFFLER & F. L. G. CHAPMAN.
VEHICLE AXLE.
No. 473,189. Patented Apr. 19, 1892.
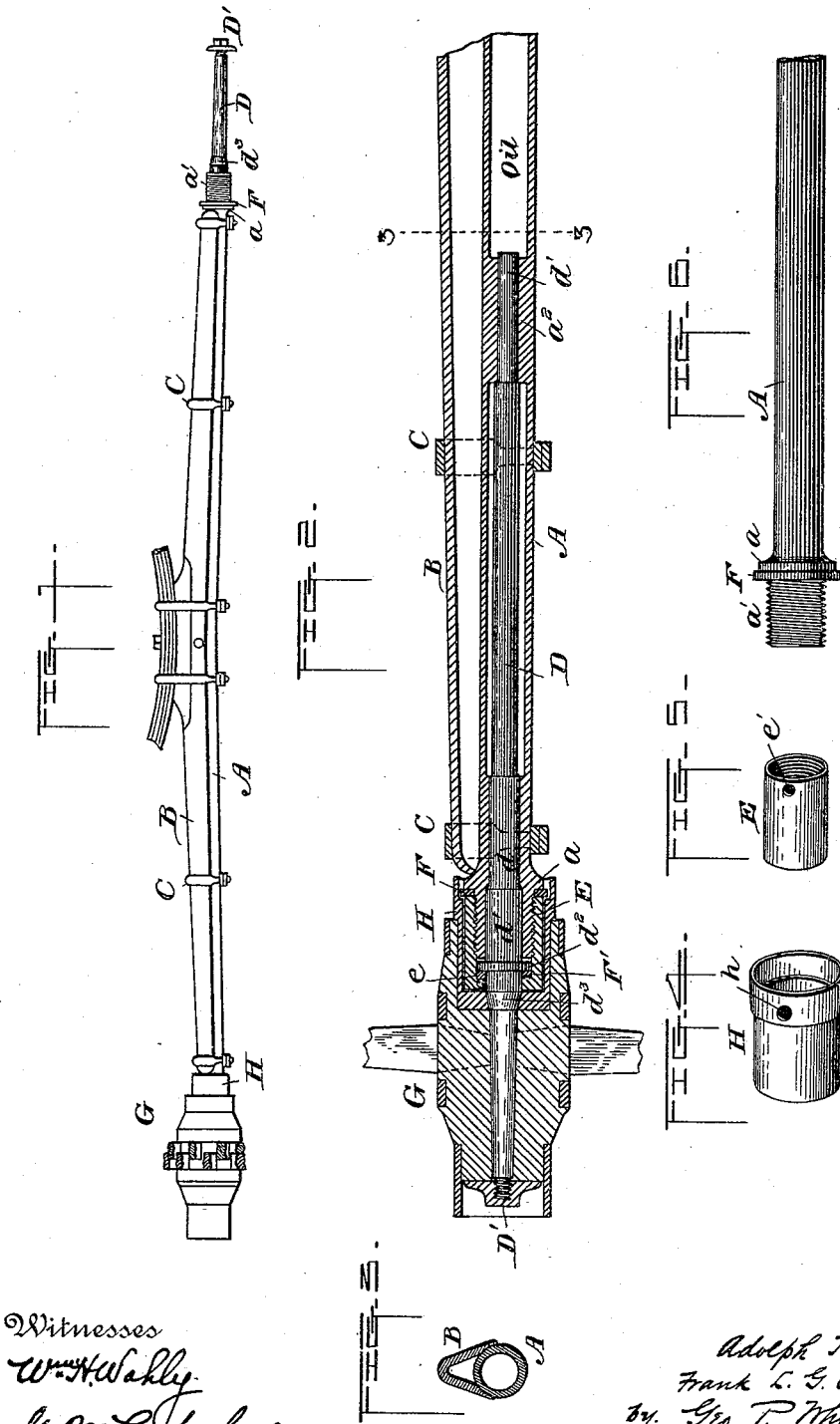

UNITED STATES PATENT OFFICE.

ADOLPH HOEFFLER AND FRANK L. G. CHAPMAN, OF STEVENS POINT, WISCONSIN.

VEHICLE-AXLE.

SPECIFICATION forming part of Letters Patent No. 473,189, dated April 19, 1892.

Application filed September 12, 1891. Serial No. 405,506. (No model.)

*To all whom it may concern:*

Be it known that we, ADOLPH HOEFFLER and FRANK L. G. CHAPMAN, citizens of the United States, residing at Stevens Point, in the county of Portage and State of Wisconsin, have invented certain new and useful Improvements in Axles; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to vehicles; and its object is to increase the durability and efficiency of the axle, being an improvement on the invention patented to F. L. G. Chapman on May 28, 1889, No. 404,342.

In the accompanying drawings, Figure 1 is an elevation of our axle. Fig. 2 is a longitudinal section of a portion of the same on a larger scale. Fig. 3 is a cross-section on line 3 3, Fig. 2. Fig. 4 is a view of the thimble. Fig. 5 shows the coupler, and Fig. 6 is a side view of the end of the axle.

The axle A is hollow, being a tube of iron or steel. Near each end is a shoulder $a$, and from the shoulder to the end the axle is externally screw-threaded, as at $a'$. The interior of the axle is divided by thick partitions $a^2$ into three chambers, the middle one of which serves as an oil-reservoir.

A bed-piece B is secured upon the axle by clips C. The bed-piece may be made of wood; but we prefer to use a strip of sheet-steel bent into the shape of an inverted V. The bed-piece fits between the shoulders $a$.

The ends of the axle A are counterbored to form bearings for the spindles D, which have stepped journals $d$ to fit said bearings. The spindles are incased in the hollow axle, and the inner end of each has a journal $d'$, fitting a bearing bored through the partition $a^2$ nearer to that end of the axle. The oil from the reservoir works through these bearings and out to the journals $d$, thus keeping the spindle constantly lubricated. The spindles are held in place by couplers E, which consist of internally-threaded sleeves, preferably cylindrical, and having an internal flange $e$ at one end. The coupler is slipped over the outer end of the spindle and screwed upon the threaded end of the axle until its inner end abuts against the shoulder $a$ or against a washer F, of leather or the like, which is clamped between the shoulder and the coupler. The flange $e$ then encircles the spindle just outside of a collar $d^2$ thereon, a washer F′, of leather or other suitable material, being placed between the collar and the flange. These washers pack the joints and prevent the oil from escaping from the outer journal $d$. The collar $d^2$ lies just beyond the end of the axle.

The wheel G is mounted upon the outer portion of the spindle, being retained thereon by a nut D′, screwed upon the end thereof. The inner end of the hub is bored out to receive a thimble H, which is firmly secured therein, and is shaped to fit closely around the coupler E. The end of the thimble projects beyond the hub and is counterbored to inclose the washer F and the shoulder $a$. The inner end of the thimble has a central conical hole to fit a conical shoulder $d^3$ of the spindle, against which it is pressed by the nut D′.

In assembling the parts the coupler E is slipped over the spindle and the hub is then clamped in place. The spindle is then inserted into the axle and the coupler screwed home against the washer F. The screw-threads $a'$ are right-hand at one end and left-hand at the other end of the axle, so that the forward motion of the wheels will not tend to unscrew the couplers. To turn the couplers, a hole $h$ is made in the projecting flange of the thimble, and a hole $e'$ in the coupler arranged to register with the hole $h$. A pin inserted through these holes locks the coupler to the hub, so that it can be screwed on or off the axle by turning the wheel. By this construction a strong, durable, and easy-running gear is provided, the joints and bearings being thoroughly protected from dust. The journals are kept constantly lubricated and will run for a long time without requiring attention. The washers render the joints practically air-tight, so that the oil cannot become dirty or gummy.

Having described our invention, what we claim, and desire to secure by Letters Patent, is—

1. The combination, with a suitable bed-piece, of a tubular axle secured to the bottom thereof having a shoulder and containing outer and inner bearings, the latter forming an oil-chamber between them, the spindles mounted to rotate in said bearings and each having a collar adjacent to the end of the axle, the coupler screwed upon the end of the axle and having a flange fitting the axle outside of the collar, the annular dust-guard or washer clamped between said coupler and the shoulder, and the hub having a flange overhanging the washer, substantially as described.

2. The combination, with a tubular metallic axle having enlarged threaded ends and shoulders integral therewith, of a bed-piece fitting the upper side of said axle and confined between the shoulders, clips for holding together the axle and bed-piece, spindles rotating in the tubular axle and provided with collars adjacent thereto, and flanged couplers screwed upon the axle with their flanges bearing against the collars on the spindles, substantially as described.

3. The combination, with a tubular metallic axle having enlarged threaded ends and shoulders adjacent thereto, of spindles rotating in said axle and provided with collars adjacent to the ends thereof, flanged couplers screwed upon the axle with their flanges bearing outside of the collars in the spindles, and hubs rigidly secured to the spindles, the inner end of each hub being counterbored and provided with a metallic thimble fitting around the flanged coupler and inclosing the shoulder, substantially as described.

4. The combination, with the tubular metallic axle A, having the shoulders $a$, inner and outer bearings, and an oil-chamber, of the spindles D, mounted in the bearings and each provided with the collars $d^2$, adjacent to the end of the axle, the couplers E, having flanges $e$, bearing outside of the collars $d^2$, the washers F, clamped between the ends of the couplers and the shoulders $a$, and the hubs rigidly fastened to the spindles and having the metallic thimbles H, provided with a flange inclosing the washer F, substantially as described.

5. The combination, with a tubular axle having a shoulder, of a spindle rotatable therein, having a collar just outside the end of the axle and a washer outside of the collar, a coupler screwed upon the axle and having a flange abutting against the washer, a second washer clamped between the coupler and the shoulder, and a hub having a thimble inclosing the coupler, the second washer, and the shoulder, substantially as described.

6. The combination, with a tubular metallic axle A, having shoulders $a$, of a bed-piece B, composed of an inverted-V-shaped piece of sheet-steel clamped upon the axle and resting between the shoulders, substantially as described.

In testimony whereof we affix our signatures in presence of two witnesses.

ADOLPH HOEFFLER.
FRANK L. G. CHAPMAN.

Witnesses:
I. S. HULL,
JOHN TOWNSEND.